(12) United States Patent
Ueno

(10) Patent No.: US 8,270,274 B2
(45) Date of Patent: Sep. 18, 2012

(54) OPTICAL DISK INSPECTION DEVICE AND INSPECTION METHOD

(75) Inventor: Keishi Ueno, Iruma (JP)

(73) Assignee: TEAC Corporation, Tama-shi, Tokyo (JP)

(*) Notice: Subject to any disclaimer, the term of this patent is extended or adjusted under 35 U.S.C. 154(b) by 19 days.

(21) Appl. No.: 12/580,095

(22) Filed: Oct. 15, 2009

(65) Prior Publication Data

US 2010/0091627 A1    Apr. 15, 2010

(30) Foreign Application Priority Data

Oct. 15, 2008 (JP) ................. 2008-266441

(51) Int. Cl.
*G11B 20/18* (2006.01)
(52) U.S. Cl. ................................... 369/53.17
(58) Field of Classification Search .............. None
See application file for complete search history.

(56) References Cited

U.S. PATENT DOCUMENTS

| | | | | |
|---|---|---|---|---|
| 6,032,276 A | * | 2/2000 | Tomishima | 714/723 |
| 2004/0141432 A1 | | 7/2004 | Toda et al. | |
| 2005/0276194 A1 | | 12/2005 | Kim et al. | |
| 2006/0013095 A1 | * | 1/2006 | Liu et al. | 369/53.15 |
| 2010/0091626 A1 | * | 4/2010 | Kubo | 369/53.2 |

FOREIGN PATENT DOCUMENTS

| | | |
|---|---|---|
| CN | 1452160 A | 10/2003 |
| CN | 1713293 A | 12/2005 |
| JP | 63-168837 A | 7/1988 |
| JP | 4341978 A | 11/1992 |
| JP | 11-86286 A | 3/1999 |
| JP | 11328858 A | 11/1999 |
| JP | 2004047000 A | 2/2004 |
| JP | 2006221696 A | 8/2006 |
| JP | 2008-165846 A | 7/2008 |

OTHER PUBLICATIONS

Chinese Office Action for corresponding CN Application No. 200910173262.7, dated Jun. 24, 2011, 11 pages.
Japanese Office Action issued in corresponding JP Application No. 2008-266441, mailed Feb. 21,2012, 4 pages.

* cited by examiner

*Primary Examiner* — Christopher R Lamb
(74) *Attorney, Agent, or Firm* — Seed IP Law Group PLLC

(57) ABSTRACT

There is provided an optical disk device which quickly inspects the presence or absence of a defect in an optical disk in order to ensure that it can be played back on various types of optical disk devices. A detection unit uses signals supplied from a playback unit to detect defects from each of an RF signal, a focus error signal, and a tracking error signal. A CPU stores positions of the defects in a memory. The playback unit plays back data while degrading playback conditions at the positions of the defects. The detection unit detects an error rate of the played-back data, and finally determines whether the optical disk is "OK" or "NG".

6 Claims, 9 Drawing Sheets

OPTICAL DISK INSPECTION DEVICE AND INSPECTION METHOD

PRIORITY INFORMATION

This application claims priority to Japanese Patent Application No. 2008-266441, filed on Oct. 15, 2008, which is incorporated herein by reference in its entirety.

BACKGROUND

1. Technical Field

The present invention relates to an optical disk inspection device and method, and in particular, relates to defect detection using an RF signal, a tracking error signal, or a focus error signal, for example.

2. Related Art

Heretofore, inspection devices for inspecting the presence or absence of a defect in an optical disk have been proposed. For example, JP 11-86286 A discloses a technique for detecting the presence or absence of failure in an optical disk based on light reflected from the optical disk.

FIG. 9 shows the structure of the prior art described therein. According to the description of the prior art, reference numeral 1 represents a CD-R disk. A spindle motor 2 drives the disk 1 to rotate. A spindle servo circuit 3 controls the drive of the spindle motor 2. An optical head 4 emits a laser beam to be applied to the disk 1, and has a photodetector (not shown) that receives the reflected beam reflected by the disk 1. A head servo circuit 5 controls the focusing and tracking of the laser beam applied to the disk 1, and drives a feed motor 6 to control the thread feed for feeding the optical head 4 in the radial direction of the disk 1. A servo control circuit 7 controls the spindle servo circuit 3 and the head servo circuit 5. An RF signal generation circuit 8 generates a main signal output by adding light reception outputs obtained from specific light receiving elements included in the photodetector in order to generate an RF signal representing a recording signal of the disk 1 from the photodetector of the optical head 4. A reflected light amount detection circuit 9 detects a level of the main signal output generated by the RF signal generation circuit 8 to detect an amount of light reflected by the disk 1. The main signal output generated by the RF signal generation circuit 8 is supplied to the reflected light amount detection circuit 9, and is also supplied to a circuit of a main signal processing system which binarizes the RF signal and decodes the digital data.

A sensor 10 generates a detection output associated with the rotation of the feed motor 6. A switch 11 is used to detect an initial set position of the optical head 4 which is located at an innermost point on the disk 1. A displacement amount detection circuit 12 detects an amount of displacement of the optical head 4 in the radial direction of the disk 1 based on the detection output from the sensor 10 using, as a base point, the position at which the switch 11 is switched. A data creation circuit 13 creates data using the detection output from the reflected light amount detection circuit 9 and the detection output from the displacement amount detection circuit 12 in the form of digital data which can be interpreted by a personal computer A serving as a host, which will be described later. An interface 14 provides matching with the personal computer A.

The personal computer A serving as a host is provided with command generation means 17 for generating a command for making a request to an external storage device connected to a connection terminal 16, and an interface 18 for providing matching with the external storage device. The command generation means 17 generates commands for respectively setting inspection conditions regarding the rotational speed at which the disk 1 is driven, the timing of detection performed by the reflected light amount detection circuit 9 and the displacement amount detection circuit 12, and the thread feed speed of the disk 1 provided by the optical head 4, and the inspection conditions are set by setting means 19, and can be changed as desired through input means 20 such as a keyboard. The personal computer A is further provided with data extraction means 21 for extracting reflected light amount information of the detection output obtained by the reflected light amount detection circuit 9 and disk position information of the detection output obtained by the displacement amount detection circuit 12 respectively as reflected light amount data and position data from the digital data created by the data creation circuit 13, disk failure determination means 22 for determining failure of the disk 1 based on the reflected light amount data extracted by the data extraction means 21, position detection means 23 for detecting a disk position in consideration of the position data extracted by the data extraction means 21 and the rotational speed at which the disk 1 is driven, and display control means 24 for controlling a display 25 connected to the personal computer A in accordance with a determination output from the disk failure determination means 22 and a disk position detection output from the position detection means 23. The position detection means 23 detects a disk position in the radial direction of the disk 1 from which reflected light amount data for use in the determination of disk failure performed by the disk failure determination means 22 is taken based on the position data, which is input, and calculates the rotational speed at which the disk 1 is driven to detect a disk position in the rotational direction of the disk 1 from which the reflected light amount data is taken based on the calculated rotational speed. The disk failure determination means 22 presets reference light amount level data as an average level of a normal reflected light amount level range in which the disk 1 can be determined to be in a normal state, compares the reflected light amount data, which is input, with the preset reference light amount level data, and determines that a failure of the disk 1 has occurred when it detects that a level difference obtained based on the comparison falls outside the normal reflected light amount level range in which the disk 1 can be determined to be in a normal state. Further, the disk failure determination means 22 identifies the location of the failure by retrieving disk position data detected by the position detection means 23, and detecting a disk position at which it is determined that a failure has occurred. A command interpretation circuit 27 interprets commands generated from the personal computer A. An access control circuit 28 controls an access operation in which the trace position of the optical head 4 on a disk is displaced in accordance with a command interpreted by the command interpretation circuit 27.

Further, JP 63-168837 A and JP 2008-165846 A also disclose defect detection techniques.

On the other hand, there is a need to quickly and reliably detect the presence or absence of a defect in an optical disk at, for example, disk rental shops, and in consideration of the circumstances under which users who rent optical disks and play them back use various types of optical disk devices to play them back, it is also desired to inspect the presence or absence of a defect in an optical disk to the extent that it can be ensured that the disk will be capable of being played back even if an optical disk device in which the playback conditions are not set to desirable conditions is used. Suppose that, for example, when a scratch defect is found on an optical disk, one optical disk device is incapable of playing it back due to the defect, but another optical disk device is capable of playing it back in spite of the fact that the defect is present because servo gain and other conditions happen to be set to favorable conditions. Because a user who rents this optical disk will not necessarily use the latter optical disk device to play it back, such an optical disk is in effect a defective optical disk, and should be determined to be unusable (NG).

SUMMARY

An object of the present invention is to provide a device and a method which can quickly inspect the presence or absence of a defect in an optical disk in order to ensure that it can be played back on various types of optical disk devices.

According to one aspect of the present invention, there is provided an optical disk inspection device for inspecting an optical disk for defects, the device comprising defect detection means for detecting a defect of the optical disk; storage means for storing a position of the detected defect; and error rate detection means for detecting an error rate by playing back data from the optical disk while degrading playback conditions at the position of the defect.

According to one embodiment of the present invention, the defect detection means detects the defect from an RF signal included in a playback signal of the optical disk, and the error rate detection means degrades the playback conditions by decreasing an amount of boost of an equalizer by which the RF signal is boosted at the position of the defect.

According to another embodiment of the present invention, the defect detection means detects the defect from a tracking error signal, and the error rate detection means degrades the playback conditions by increasing a tracking servo gain at the position of the defect.

According to still another embodiment of the present invention, the defect detection means detects the defect from a focus error signal, and the error rate detection means degrades the playback conditions by increasing a focus servo gain at the position of the defect.

According to another aspect of the present invention, there is provided an optical disk inspection method for inspecting an optical disk for defects, the method comprising the steps of (a) detecting a defect of the optical disk; (b) storing a position of the detected defect in storage means; and (c) detecting an error rate by playing back data from the optical disk while degrading playback conditions at the position of the defect.

According to the present invention, the presence or absence of a defect in an optical disk can be quickly inspected in order to ensure that it can be played back on various types of optical disk devices.

DETAILED DESCRIPTION

An embodiment of the present invention will be described below with reference to the accompanying drawings.

Figure 1:
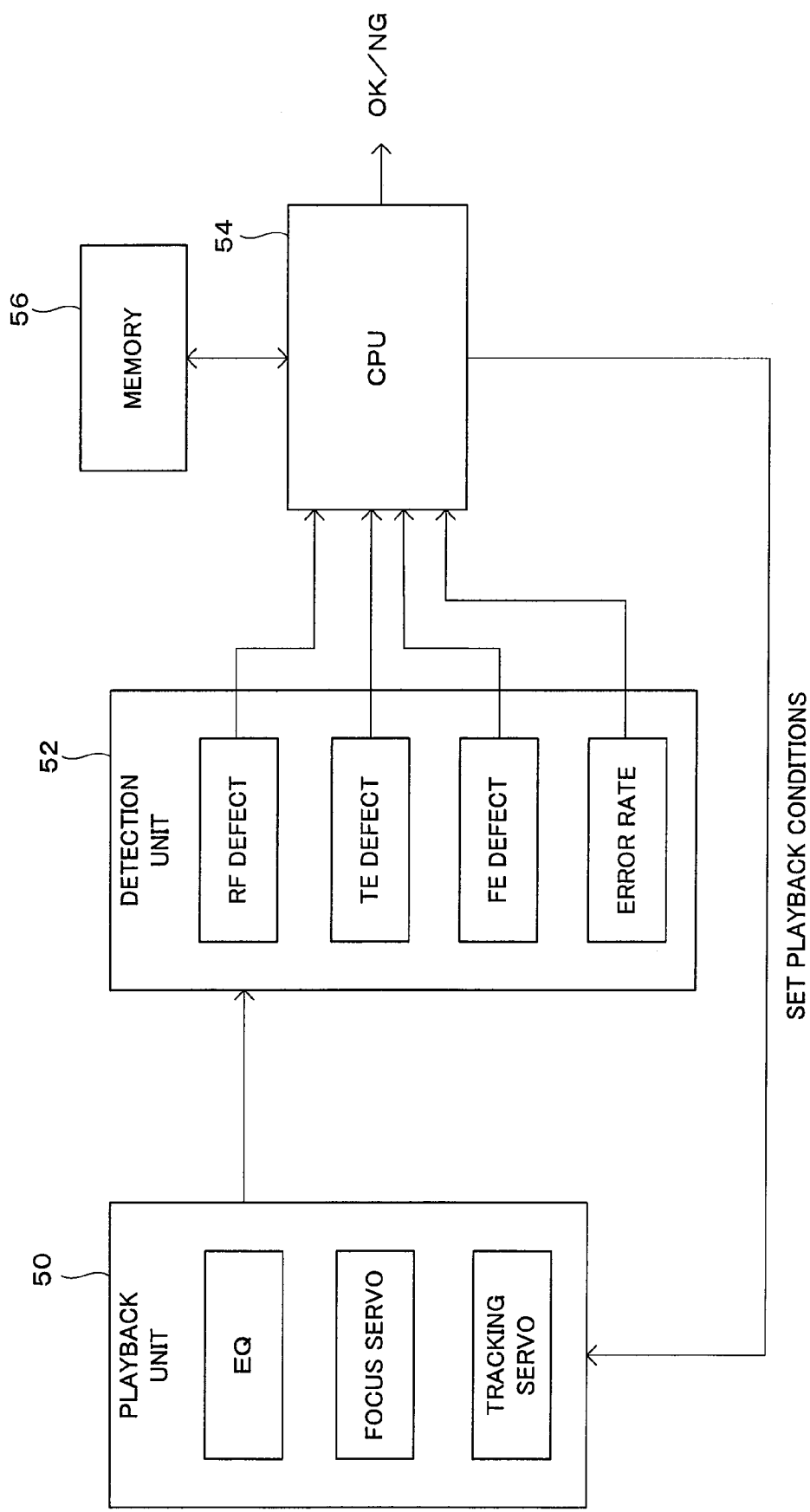
FIG. 1 is a structural block diagram of an embodiment of the present invention.
Figure 9:
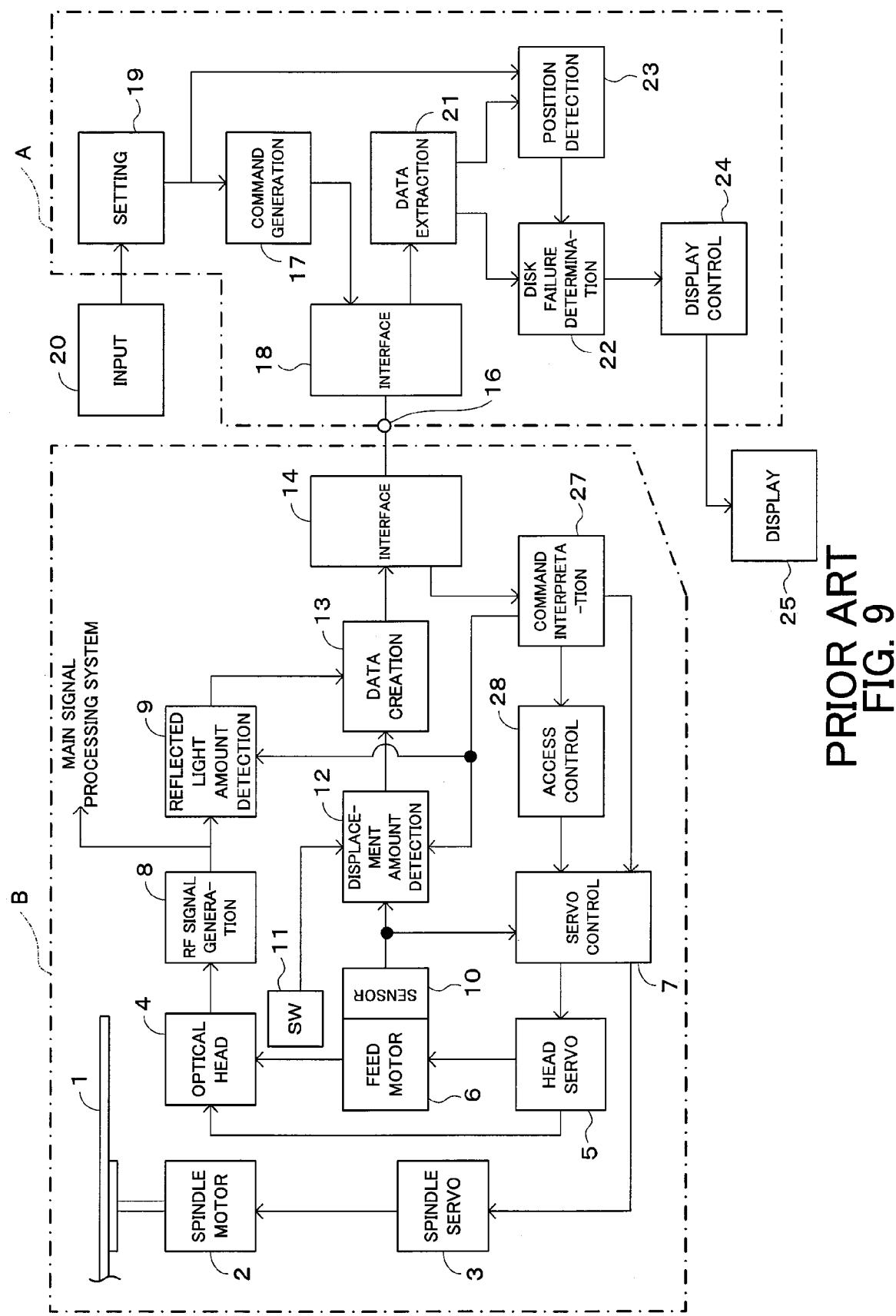
FIG. 9 is a block diagram of a conventional device.

FIG. 1 shows a functional block diagram of an optical disk inspection device according to an embodiment of the present invention. A playback unit 50 includes a spindle motor 2, an optical head 4, a feed motor 6, a servo control circuit 7, an RF signal generation circuit 8, a sensor 10, and the like, as shown in FIG. 9, and generates an RF signal by applying laser light to an optical disk and receiving light reflected therefrom. The playback unit 50 also generates a tracking error signal and a focus error signal, and causes the servo control unit 7 to perform focus servo and tracking servo based on these error signals. The RF signal generation circuit 8 is provided with an equalizer (EQ) which boosts a predetermined frequency component of the RF signal, for example, a 3T signal (where T represents a reference clock period), by a predetermined amount. In the diagram, an equalizer (EQ), a focus servo unit, and a tracking servo unit are shown as typical components of the playback unit 50. The RF signal, the focus error signal, and the tracking error signal generated by the playback unit 50 are supplied to a detection unit 52.

The detection unit 52 has an RF defect unit that detects the presence or absence of a defect in an RF signal, a TE defect unit that detects the presence or absence of a defect in a tracking error (TE) signal, an FE defect unit that detects the presence or absence of a defect in a focus error (FE) signal, and an error rate detection unit that detects an error rate of a playback signal. The results of detection obtained by the defect units and detection unit are supplied to a CPU 54.

The CPU 54 is formed as, for example, a CPU of the personal computer A shown in FIG. 9. It may also be formed of a CPU incorporated in an optical disk device. More specifically, all components shown in the structural block diagram of FIG. 1 may be provided in an optical disk device. The CPU 54 sequentially stores defect candidate positions on an optical disk to be inspected in a memory 56 based on defect signals supplied from the defect units. More specifically, a defect position of the RF signal, a defect position of the FE signal, and a defect position of the TE signal are individually stored in the memory 56.

Specific steps are as described below. First, after an optical disk to be inspected is set in the playback unit 50 and various parameters are adjusted, the focus servo and the tracking servo are turned ON. Next, the feed motor 6 is used to move the optical head 4 to an innermost point of the optical disk. More precisely, the term "innermost radius" refers to a track which is located innermost in a region from which data is to be played back, and is a region from which an RF signal and a TE signal are obtained. A radial position of an innermost track from which data is to be played back is referred to as "rin", and a radial position of an outermost track from which data is to be played back is referred to as "rout". After the optical head 4 is moved to the position "rin", the tracking servo is turned OFF. At this point in time, the TE signal is in a state in which an open error occurs, and the RF signal is in a state in which the amplitude changes in synchronization with a track crossing. With this state maintained, the feed motor 6 is used to move the optical head 4 to the position "rout". As the optical head 4 moves, the RF signal, the TE signal, and the FE signal sequentially change, and if there is a defect in the optical disk, an abnormality will occur in one or more of the RF signal, the TE signal, and the FE signal, respectively, at the position corresponding to the defect. This abnormality is detected by the defect units. The detected radial position is then stored in the memory 56.

After the defect positions of the RF signal, the TE signal, and the FE signal are individually stored in the memory 56, the CPU 54 again plays back the optical disk, moving the optical head 4 to these defect positions stored in the memory 56 to play it back while changing playback conditions. The CPU 54 determines in which of the RF signal, the FE signal, or the TE signal a defect is found at each of these defect positions, and temporarily changes playback conditions in accordance with the type of the signal in which a defect is found at a defect position. For example, the amount of boost (Q value) of the equalizer (EQ) may be changed, the gain of the focus servo may be changed, or the gain of the tracking servo may be changed. However, in the present embodiment, the CPU 54 changes playback conditions such that they are degraded at a defect position. For example, for the equalizer (EQ), when the amount of boost of a 3T signal during normal playback is A (dB), it is temporarily set to an amount of boost B which is less than A (dB) to perform playback at a defect position. Further, for the tracking servo and the focus servo, the gain is temporarily set to an amount of gain which is greater than an amount of gain applied during normal playback to perform playback at a defect position. Then, an error rate occurring when playback is performed at a defect position while playback conditions are being thus degraded is detected, and it is determined whether or not the detected error rate is less than or equal to a reference value. The reason that playback conditions are thus degraded is because optical disk devices used by users vary widely, and it can be assumed that, among those, there may be an optical disk device in which playback conditions are not necessarily suitable. Playback conditions are degraded in order to evaluate the influence of a defect on the assumption that playback is performed on such an optical disk device. When an error rate obtained while playback conditions are being degraded is small enough to be less than or equal to the reference value, it is determined that any given optical disk device used by a user can similarly perform playback without problems, or, in other words, that the disk is not defective (OK). On the other hand, when an error rate obtained while playback conditions are being degraded is greater than the reference value, it is determined that a problem may similarly arise during playback in any given optical disk device used by a user, or, in other words, that the disk is defective (NG). The result of determination "OK" or "NG" is, for example, displayed on a display 25 of a personal computer A as in FIG. 9. Alternatively, it is also possible to indicate that the result is "OK" or "NG" by, for example, causing an LED provided on the optical disk device to light up or blink.

Figure 2:
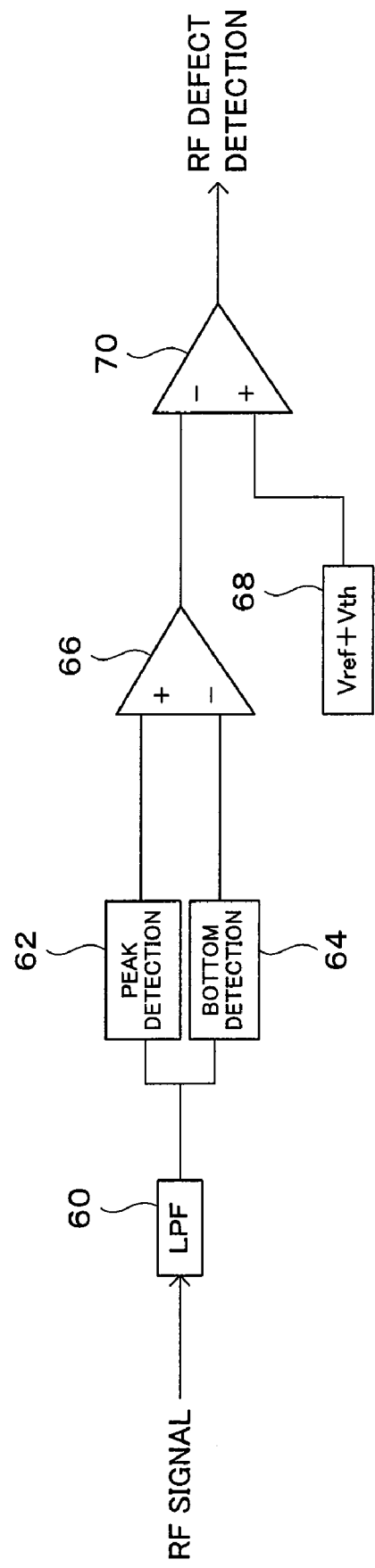
FIG. 2 is a circuit block diagram of an RF defect unit.
Figure 3:
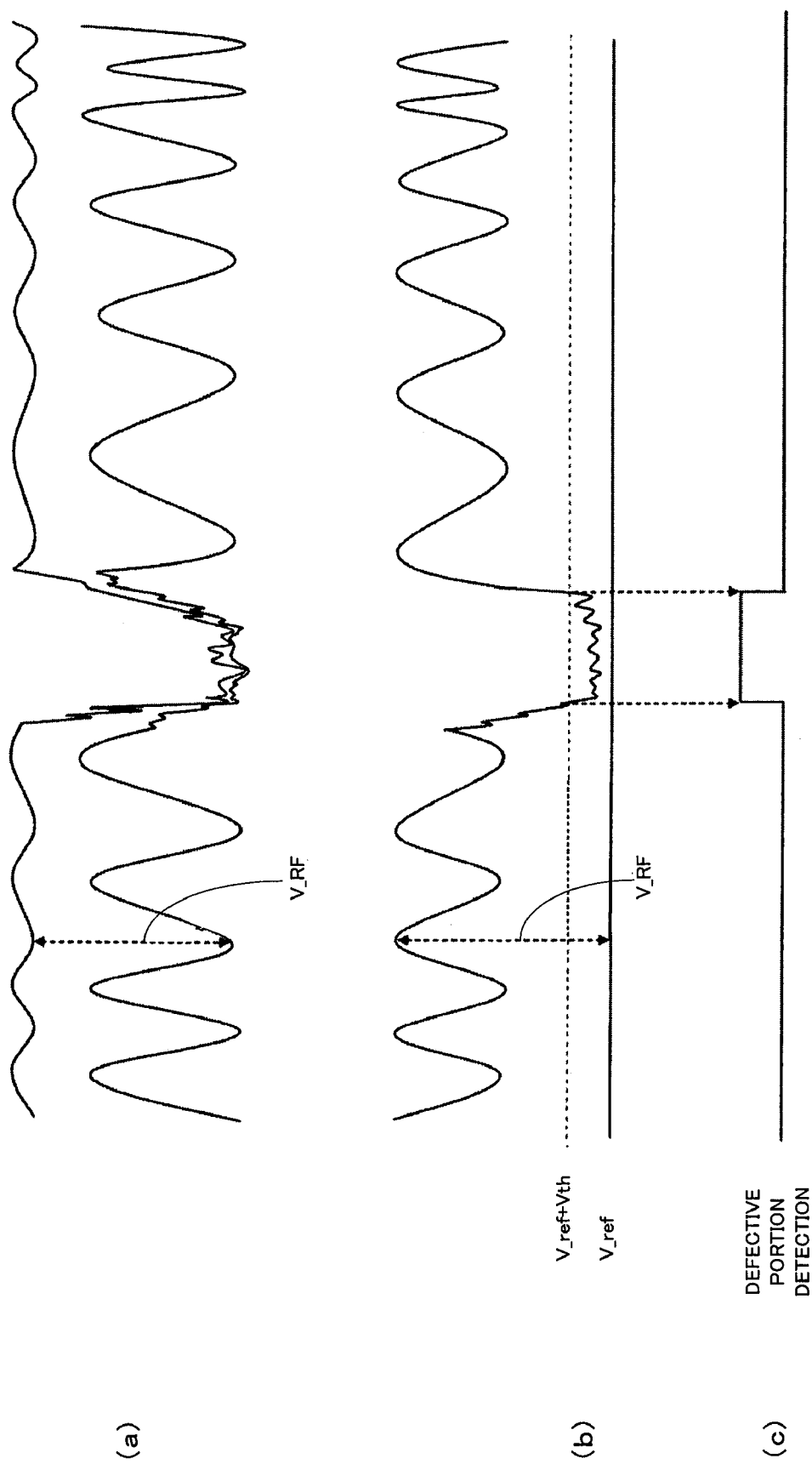
FIG. 3 is a timing chart of FIG. 2.

FIG. 2 shows a structure of the RF defect unit included in the detection unit 52. Further, FIG. 3 shows a timing chart of signals in the RF defect unit. An RF signal obtained by the playback unit 50 is supplied to a peak detector 62 and a bottom detector 64 after high-frequency noise is removed through an LPF 60. The peak detector 62 and the bottom detector 64 respectively detect a peak value and a bottom value of the RF signal, and supply them to a differential amplifier 66.

The differential amplifier 66, to which a peak detection signal supplied from the peak detector 62 and a bottom detection signal supplied from the bottom detector 64 are input, calculates a difference between these signals to generate a VRF signal. FIG. 3(a) shows the peak detection signal, the bottom detection signal, and the VRF signal. The VRF signal is supplied to a comparator 70.

The comparator 70 compares the magnitude of the VRF signal with a threshold value (Vref+Vth) 68 to generate a defective portion detection signal of the RF signal. FIG. 3(b) shows the VRF signal and the threshold value (Vref+Vth). Further, FIG. 3(c) shows the defective portion detection signal of the RF signal. At the time when the VRF signal becomes less than the threshold value, the level of the defective portion detection signal changes from "Low" to "Hi".

Figure 4:
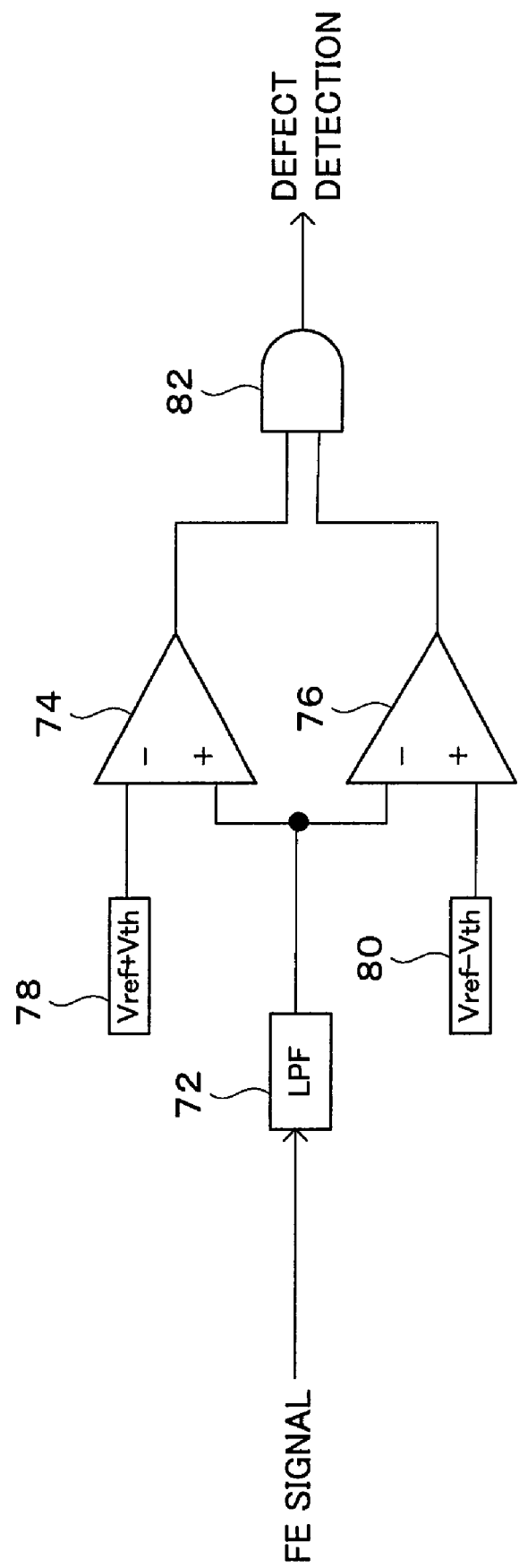
FIG. 4 is a circuit block diagram of an FE defect unit.
Figure 5:
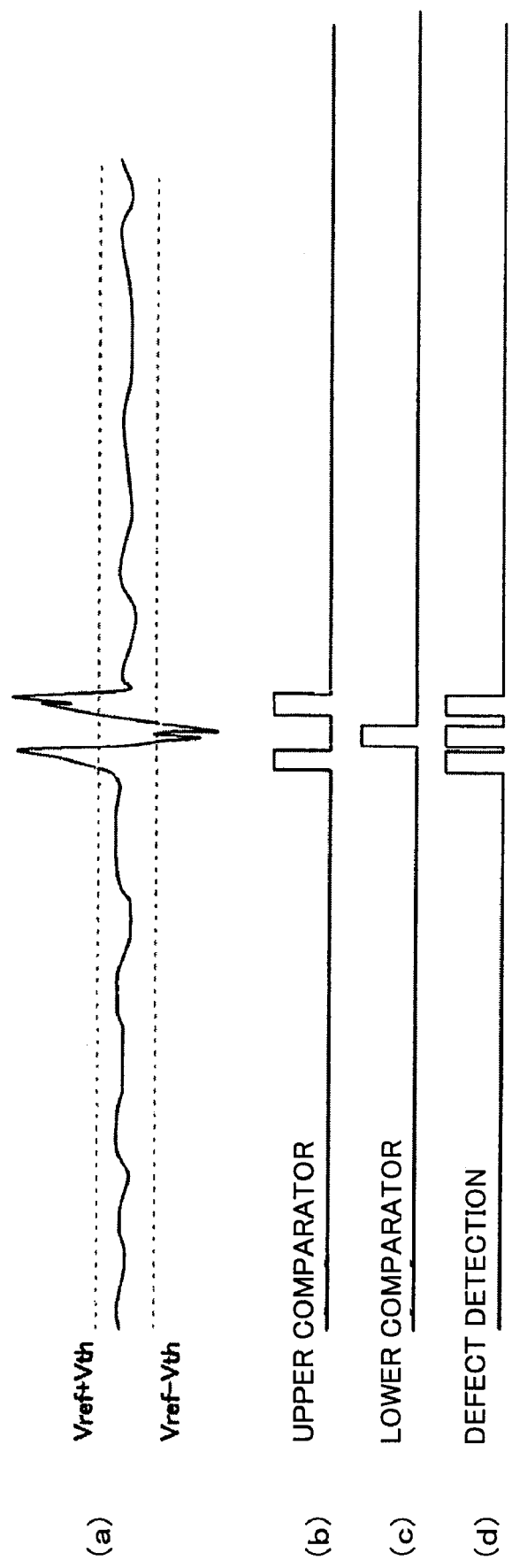
FIG. 5 is a timing chart of FIG. 4.

FIG. 4 shows a structure of the FE defect unit included in the detection unit 52. Further, FIG. 5 shows a timing chart of signals in the FE defect unit. An FE signal obtained by the playback unit 50 is supplied to each of comparators 74 and 76 after high-frequency noise is removed through an LPF 72.

The comparator 74 compares the magnitude of the FE signal on the plus side with a threshold value (Vref+Vth) 78. Further, the comparator 76 compares the magnitude of the FE signal on the minus side with a threshold value (Vref−Vth) 80. Signals representing the results of comparison from the respective comparators are supplied to an OR gate 82. FIG. 5(a) shows the FE signal and the two threshold values in the comparators 74 and 76. Further, FIG. 5(b) and FIG. 5(c) respectively show an output signal supplied from the comparator 74 (an upper comparator) and an output signal supplied from the comparator 76 (a lower comparator). FIG. 5(d) shows an output signal supplied from the OR gate 82. This output signal is output as a defective portion detection signal of the FE signal. At the time when the level of the FE signal becomes greater than or equal to the threshold value, the level of the defective portion detection signal changes from "Low" to "Hi".

Figure 6:
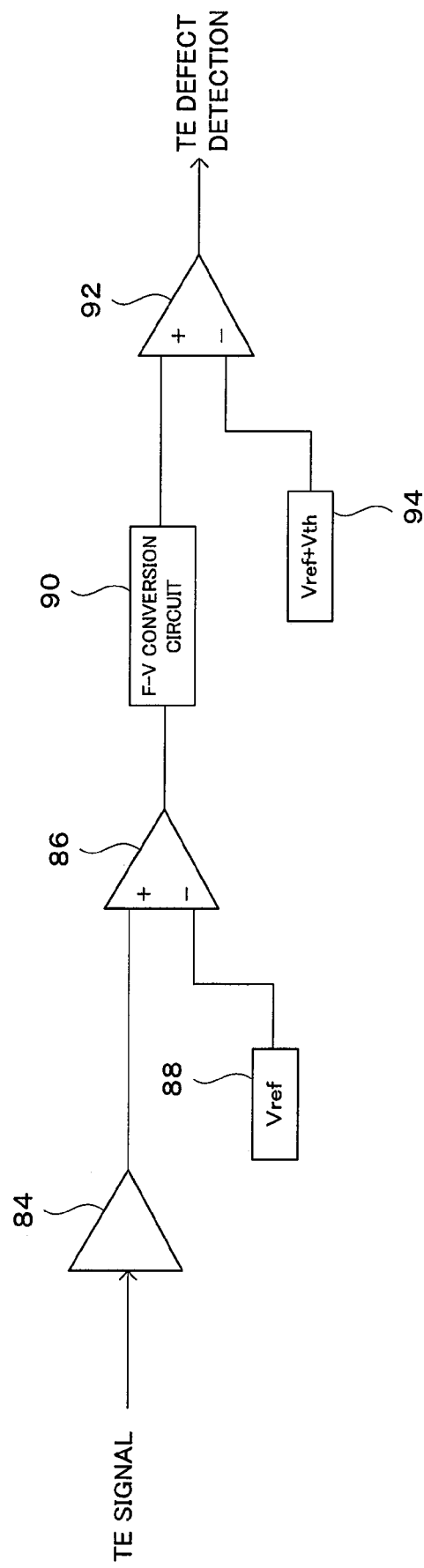
FIG. 6 is a circuit block diagram of a TE defect unit.
Figure 7:
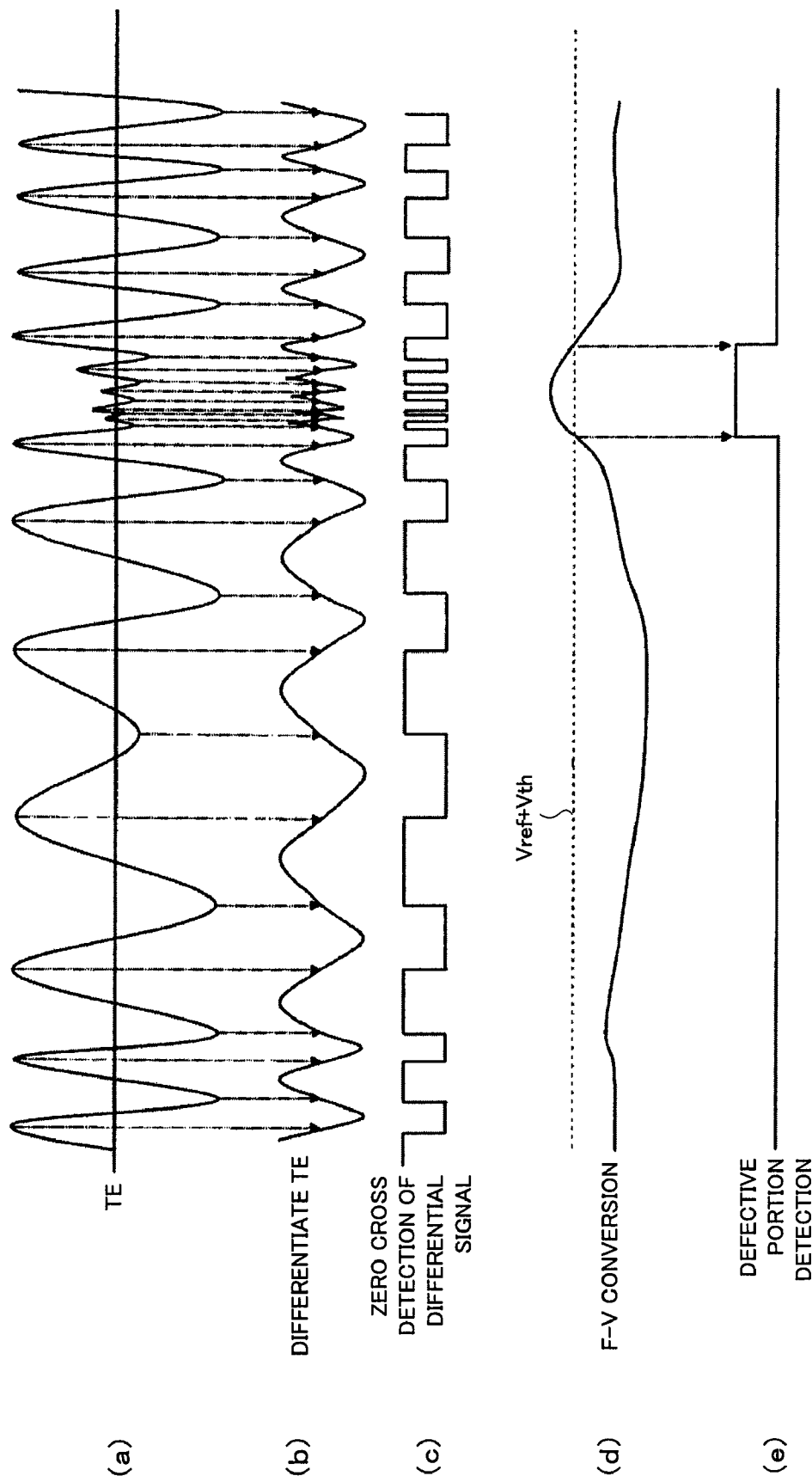
FIG. 7 is a timing chart of FIG. 6.

FIG. 6 shows a structure of the TE defect unit included in the detection unit 52. Further, FIG. 7 shows a timing chart of signals in the TE defect unit. A TE signal obtained by the playback unit 50 is converted by a differentiation amplifier 84 into a differential waveform, which in turn is supplied to a zero cross comparator 86. FIG. 7(a) shows the TE signal. Further, FIG. 7(b) shows the differential waveform supplied from the differentiation amplifier 84.

The zero cross comparator 86 compares the magnitude of the differential signal with a threshold value 88. FIG. 7(c) shows a signal supplied from the zero cross comparator 86.

An F-V conversion circuit 90 converts a frequency of the zero cross signal supplied from the zero cross comparator 86 into a voltage signal, and outputs it. FIG. 7(d) shows an output signal supplied from the F-V conversion circuit 90. With a higher-frequency component, the voltage value will be higher.

A comparator 92 compares the magnitude of the voltage signal supplied from the F-V conversion circuit 90 with a threshold value (Vref+Vth) 94, and outputs the result as a defective portion detection signal of the TE signal. FIG. 7(e) shows the defective portion detection signal. At the time when the voltage becomes high enough to be greater than or equal to the threshold value, the level of the defective portion detection signal changes from "Low" to "Hi".

As described above, defective portions in the RF, TE, and FE signals are detected, and the positions of the defective portions are stored in the memory 56. Then, after defects are detected from an innermost point to an outermost radius of an optical disk to be inspected, the optical head 4 is again moved to the innermost point to play back data from the defect positions stored in the memory 56 to determine an error rate of the data.

Figure 8:
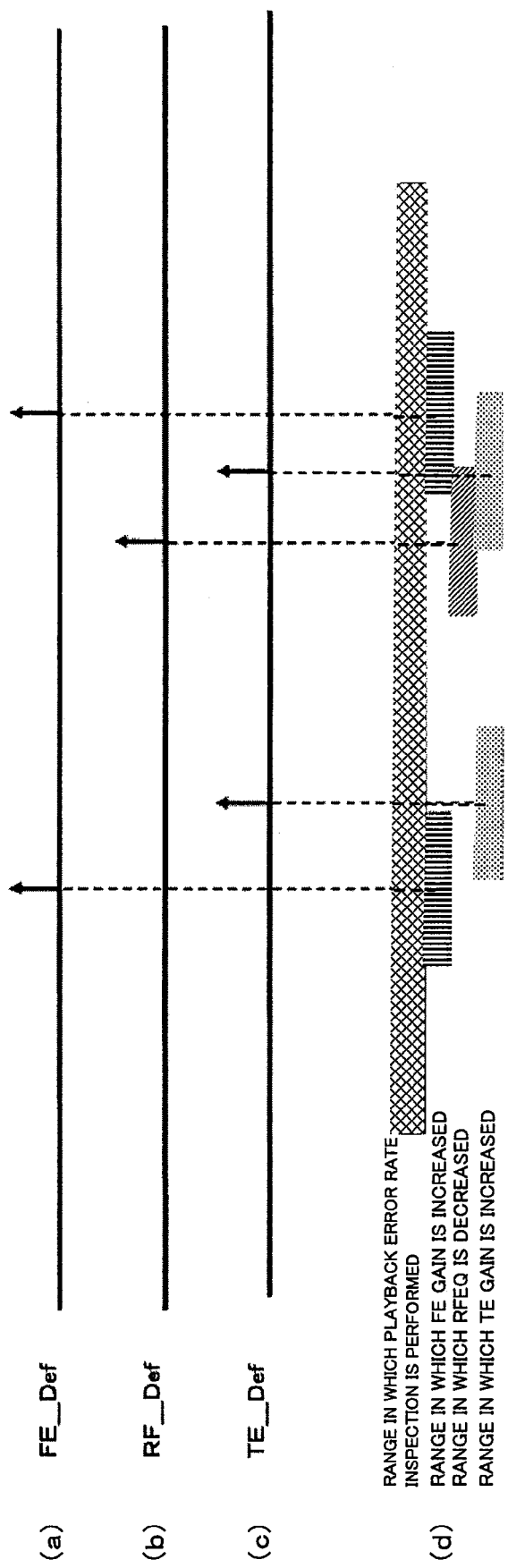
FIG. 8 is a timing chart showing playback at defective portions.

FIG. 8 shows playback conditions applied to defective portions in the RF signal, the TE signal, and the FE signal. For each defective portion, playback conditions are intentionally "degraded" in accordance with the type of the signal of the defective portion. FIG. 8(a) shows defective portions of the FE signal, FIG. 8(b) shows a defective portion of the RF signal, and FIG. 8(c) shows defective portions of the TE signal. Each of the figures illustrates that a defective portion in each signal is present at a portion indicated by an arrow. Further, FIG. 8(d) shows a range in which a playback error rate inspection is performed, and degradation of playback conditions according to each defective portion. When a defective portion is present in the FE signal, playback is performed while the focus servo gain is being temporarily increased. For example, when a defective portion is present in the FE signal, the focus servo gain is increased either by a predetermined amount or by a predetermined ratio, over a range of plus or minus 1 mm of the position of the defective portion. The increase in the focus servo gain will result in causing the focus position to significantly fluctuate where a defect such as a scratch is present so as to follow it. Further, when a defective portion is present in the RF signal, the amount of boost of the equalizer by which a 3T component of the RF signal is boosted is temporarily decreased either by a predetermined amount or by a predetermined ratio. The decrease in the amount of boost of the equalizer will result in making it correspondingly more difficult to extract the 3T component and perform playback. The period during which the amount of boost is temporarily decreased is similar to that in the case where a defective portion is present in the FE signal. Further, when a defective portion is present in the TE signal, playback is performed while the tracking servo gain is being temporarily increased. The increase in the tracking servo gain will result in causing the tracking position to significantly fluctuate where a defect such as a scratch is present so as to follow it. Thus, playback conditions are intentionally degraded during playback of defective portions to inspect the error rate. Then, when the obtained error rate is low enough to be less than or equal to a predetermined reference value, the defective portions are considered to be merely ones which can be played back without problems even in an optical disk device in which playback conditions are not necessarily suitable, and it is determined that the optical disk under inspection has no problem (OK). On the other hand, when the obtained error rate is high enough to exceed the predetermined reference value, the defective portions are considered to be ones which cannot be played back in an optical disk device in which playback conditions are not necessarily suitable, and it is determined that the optical disk under inspection has a problem (NG).

It should be noted that in FIG. 8(d), where defective portions of the RF signal, the TE signal, and the FE signal are present close to each other, because playback conditions are respectively degraded over a range of plus or minus 1 mm of each defective portion, the result is that degradation of two or more playback conditions occurs in an overlapping manner. For example, when a defective portion of the FE signal and a defective portion of the TE signal are present close to each other, there is a period during which the focus servo gain is increased, and the tracking servo gain is also increased. By allowing such an overlap, it is also possible to simulate playback conditions of an optical disk device in which the focus servo gain and the tracking servo gain are both not suitable.

Although in the above-described embodiment, it is determined whether an optical disk is "OK" or "NG" depending on the degree of the error rate, and the result "OK" or "NG" is displayed on a display, it is also possible to display other information, such as an indication as to whether or not a defective portion is present, and an indication as to whether or not the error rate is acceptable.

Further, although in the above-described embodiment, playback conditions are degraded over a range of plus or minus 1 mm of a defect position, this embodiment is given only by way of example, and a different range may also be set. For example, instead of a range of plus or minus 1 mm, a range of plus or minus several to tens of tracks may also be employed.

Further, although in the above-described embodiment, a decrease in the amount of boost (Q value) of the equalizer, an increase in the tracking servo gain, and an increase in the focus servo gain are described as examples of degradation of playback conditions, the present invention is not limited to these examples. The degradation of playback conditions refers to lowering the scratch tolerance of an optical disk device, and any relevant parameters may be adjusted. For example, playback conditions may be degraded by reducing playback power during playback.

What is claimed is:

1. An optical disk inspection device for inspecting an optical disk for defects, the device comprising:
   a defect detection unit configured to detect a defect of the optical disk from an RF signal included in a playback signal of the optical disk;
   a storage unit configured to store a position of the detected defect; and
   an error rate detection unit configured to detect an error rate by playing back data from the optical disk while degrading playback conditions by decreasing an amount of boost of an equalizer by which the RF signal is boosted at the position of the defect.

2. An optical disk inspection device for inspecting an optical disk for defects, the device comprising:
   a defect detection unit configured to detect a defect of the optical disk from a tracking error signal;
   a storage unit configured to store a position of the detected defect; and
   an error rate detection unit configured to detect an error rate by playing back data from the optical disk while degrading playback conditions by increasing a tracking servo gain at the position of the defect.

3. An optical disk inspection device for inspecting an optical disk for defects, the device comprising:
   a defect detection unit configured to defect of the optical disk from a focus error signal;
   a storage unit configured to store a position of the detected defect; and
   an error rate detection unit configured to detecting an error rate by playing back data from the optical disk while degrading playback conditions by increasing a focus servo gain at the position of the defect.

4. An optical disk inspection method for inspecting an optical disk for defects, the method comprising the steps of:
   (a) detecting a defect of the optical disk from an RF signal included in a playback signal of the optical disk;
   (b) storing a position of the detected defect in a storage; and
   (c) detecting an error rate by playing back data from the optical disk while degrading playback conditions by decreasing an amount of boost of an equalizer by which the RF signal is boosted at the position of the defect.

5. An optical disk inspection method for inspecting an optical disk for defects, the method comprising the steps of:
   (a) detecting a defect of the optical disk from a tracking error signal;
   (b) storing a position of the detected defect in a storage; and
   (c) detecting an error rate by playing back data from the optical disk while degrading playback conditions by increasing a tracking servo gain at the position of the defect.

6. An optical disk inspection method for inspecting an optical disk for defects, the method comprising the steps of:
   (a) detecting a defect of the optical disk from a focus error signal;
   (b) storing a position of the detected defect in a storage; and
   (c) detecting an error rate by playing back data from the optical disk while degrading playback conditions by increasing a focus servo gain at the position of the defect.

* * * * *